United States Patent [19]

Wilmer et al.

[11] Patent Number: 4,486,781

[45] Date of Patent: Dec. 4, 1984

[54] VIDEO SIGNAL WHITE LEVEL CORRECTOR

[75] Inventors: Michael E. Wilmer, Portola Valley; Leland D. Green, Sierra Madre; Rudiger W. Tietze, Altadena, all of Calif.

[73] Assignee: Xerox Corporation, Stamford, Conn.

[21] Appl. No.: 369,395

[22] Filed: Apr. 19, 1982

[51] Int. Cl.³ .......................... H04N 5/30; H04N 5/21
[52] U.S. Cl. ..................................... 358/163; 358/167
[58] Field of Search ................ 358/160, 163, 213, 167

[56] References Cited

U.S. PATENT DOCUMENTS

| | | | |
|---|---|---|---|
| 3,800,078 | 3/1974 | Cochran | 178/7.1 |
| 3,800,079 | 3/1974 | McNeil | 178/7.1 |
| 3,830,972 | 8/1974 | Siverling | 178/7.1 |
| 4,193,093 | 3/1980 | ST. Clair | 358/163 |
| 4,343,021 | 8/1982 | Frame | 358/163 |

Primary Examiner—Michael A. Masinick
Attorney, Agent, or Firm—Robert E. Cunha

[57] ABSTRACT

A video signal white level corrector wherein a digital memory is used to store a correction signal which is applied to a signal multiplier to remove white level shading which results from optic and beam misalignment of a scanner. Video signals are applied to a multiplier 10, the output therefrom being the corrected video signal. The correction signal is stored for future use in a digital memory 14 after being compared to a reference voltage at comparator 20. In a first, or "store", mode, the output from the comparator 20 is coupled to an integrator 22, the output of which increases or decreases the gain of multiplier 10. In a second, or "operate", mode, the output from the digital memory is coupled to integrator 22 to also control the gain of multiplier 10.

4 Claims, 3 Drawing Figures

VIDEO SIGNAL WHITE LEVEL CORRECTOR

This invention relates to a one dimensional scan detector system wherein a digital memory is used to store a correction signal which is applied to a single multiplier to remove white level shading which results from optic and beam misalignment.

BACKGROUND OF THE INVENTION

In scanned detector systems such as television cameras or laser scanners, there usually exists the problem that when viewing a perfectly white target, the resulting video signals do not necessarily appear flat as they should, but contain various amounts of shading. This is the result of various factors, such as change in the lens transmission across its field of view, camera tube beam landing errors, or optical system misalignment. This shading represents an error in the signal and results in the inaccurate reproduction of the scenes viewed. Unfortunately, the sources of the errors cannot be eliminated easily. In television cameras various adjustable signals such as ramps and parabolas in both scan directions are made available to be added or subtracted from the video signals so as to produce a flat signal when viewing a white scene.

The detection system of the present invention is characterized in that the detected video level signal is compared to a reference level and the video level signal is corrected for an output flat response.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
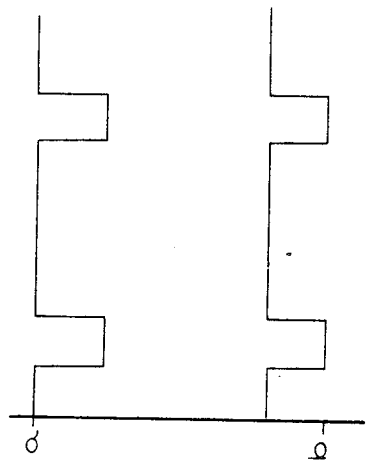
FIG. 1 shows an ideal signal and a signal which has been modified due to shading in the system.

This invention concerns a one dimensional laser, for example, scanner, where white level shading results from the optics and laser beam misalignment. This shading also varies with temperature, and as the laser warms up and the beam wanders. FIG. 1A shows a video signal in the ideal situation. The upper level of the signal represents white or background information, while the vertical signals relate to information detected in the scanned system. FIG. 1B shows the same two information signals with the curvy line representing the white signal, however, influenced by white shading characteristics in the signal. A digital memory is used to store a correction signal which is applied to a signal multiplier so as to remove this shading from the signal.

Figure 2:
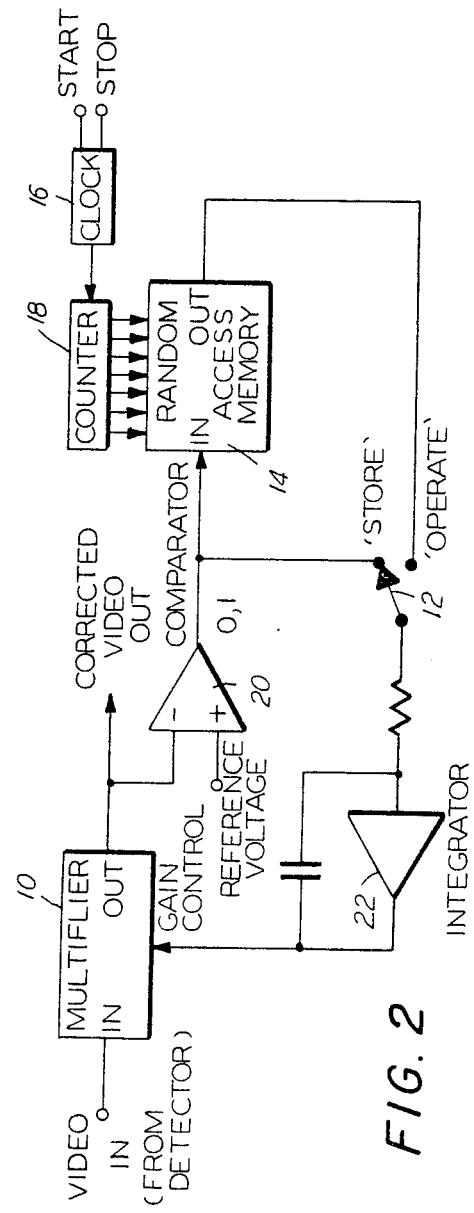
FIG. 2 shows one basic system incorporating the principles of the present invention.
Figure 3:
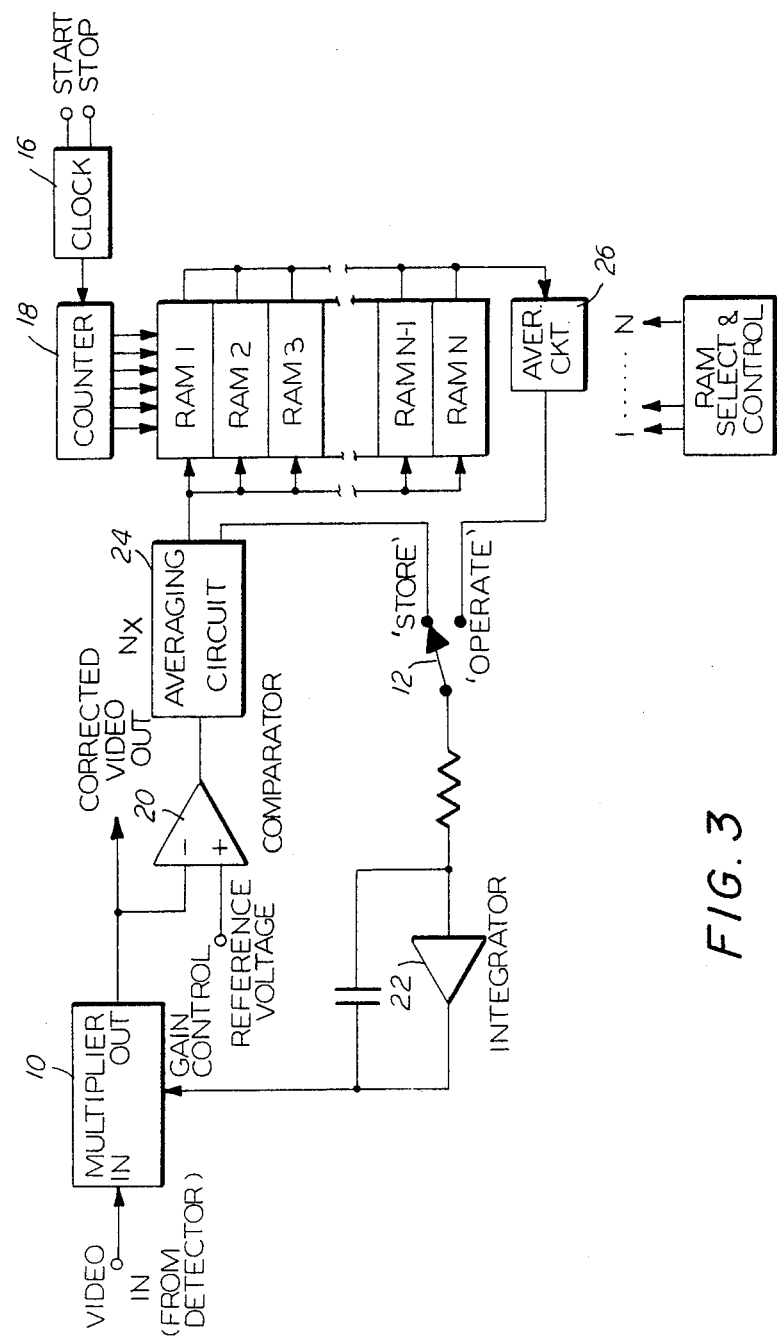
FIG. 3 is an improved system over that described in conjunction with FIG. 2.

A block diagram of such a system is shown in FIG. 2. Video signals from a detector are applied to a multiplier 10, the output therefrom being the corrected video signal which can be applied to its normal destination, i.e., a display, printer, etc. There are two modes of operation, "store" and "operate", as chosen by switch 12. In the "store" mode the correction signal is generated and stored in the digital memory 14 by showing a flat white target to the detector, not shown, which generates the video signal applied to multiplier 10. Each video scan line is arbitrarily divided into a number of time slots, typically 1024. This would be the same number as the number of bits available in the random access memory 14 used to store the correction signal. The larger the number of bits used, the better will be the final picture quality; however, the number is limited by the speed of response of the multiplier 10 and the random access memory 14. The slot positions are synchronized to the video scan line by a set of "start of scan" and "end of scan" signals applied to the random access memory 14 via clock 16, applied to counter 18. Each slot has a unique address which is produced by the address counter 18 and clock 16 that counts out 1024 pulses per scan line.

The output video level from multiplier 10 is compared to a reference level applied to comparator 20, this comparator 20 producing either a 0 or a 1 output for each time slot, depending on whether the video level from multiplier 10 is higher or lower than the reference voltage applied to comparator 20. The comparator output is then stored in the random access memory 14. The comparator output is also applied to an integrator 22 (with offset) and the integrator output is used as the gain control signal applied to multiplier 10. The "store" mode, as chosen by switch 12, is therefore a closed loop operation. For each time slot, the video output level of multiplier 10 is checked by comparator 20, a 1 (or zero) is generated, which causes the integrator 22 output to slew down (or up), which increases (or decreases) the gain of multiplier 10, thus adjusting the video output signal from multiplier 10 to that of the reference level. Meanwhile, the 1's and 0's are also stored in the random access memory 14 for future use. If the input video signal to multiplier 10 is perfectly flat, then an alternating stream of 1's and 0's would be produced, which leaves a sawtooth voltage on the video signal. The system gain would be then adjusted so that each bit only has a small effect on the output so as to produce the minimum amount of ripple, yet should be large enough to remove whatever shading is present.

In the "operate" mode, via switch 12, the comparator 20 is not used. Instead, the bits stored in the random access memory 14 are played back synchronously with the video input signals and used to generate a control signal through integrator 22. This control signal would still remove the system shading even when a different scene is viewed. This process is now an open loop correction, and should work correctly until the shading signal changes, possibly due to laser warm up, etc. Then a new "store" operation, as above, must be accomplished.

Several improvements are possible to the system shown and described in conjunction with FIG. 2. These have to do with noise in the video signal input and the white reference material used in the store operation to load the random access memory with a predetermined pattern. The first improvement is to sample each bit slot a large number of times before deciding on whether to record a 1 or 0 in the first random access memory as via averaging circuit 24. Since the input video signal usually contains some amount of random noise, some of the noise will end up in the stored control signal applied to multiplier 10 and be more noticeable than before, since it will be used to correct an entire page, for example. Averaging brings about an improvement in the stored control signal in the random access memory proportional to the square root of the number of times the signal is sampled. A practical limit is placed on the amount of averaging by how long it takes.

A second improvement reduces the noise produced by scanning the white reference material. Noise is produced due to the texture of the material on a microscopic level, and this also ends up in the control signal and becomes more visible. To reduce this noise component, additional random access memories 1 through n are added and the signals from different locations on the white material are stored, and the average of these signals used during the operate mode. This method also improves the random noise in the signal, and reduces the ripple in the video again by the square root of the number of registers used. The output from the random access memories 1 through n passes through averaging circuit 26 and through the operate part of switch on its way to integrator 22.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A scan detector system for compensating for shading errors in the detected white level signals in a video signal comprising:
   multiplier circuit means for receiving for each bit position said video signal and multiplying it by a received gain control signal to generate a corrected video signal,
   comparator circuit means for generating a high or low signal consisting of a single bit in response to said corrected video signal in comparison with a reference voltage,
   random access memory means for storing said high or low signal in a first mode, and for reading out said high or low signal in a second mode, and
   integrator circuit means, responsive to said comparator means output in said first mode, and to said memory means output in said second mode, for changing said gain control signal one increment higher or lower than the gain control signal for the previous bit position and applying it to said multiplier circuit means.

2. The scan detector as set forth in claim 1 further including a switch for selectively switching from said first mode to said second mode, wherein the output of said comparator circuit is coupled to the input of said integrator circuit means in said first mode, and the input of said random access memory means in said second mode.

3. The scan detector as set forth in claim 2 wherein said random access memory means is synchronized to the input video signals by a clock circuit applied to a counter circuit which generates an address count for each bit position for said high or low signal from said comparator means.

4. The scan detector as set forth in claim 3 further including,
   averaging circuit means between said comparator circuit means and said random access memory means for averaging the digital signal prior to application to said random access memory means.

* * * * *